US009885516B2

United States Patent
Cur et al.

(10) Patent No.: US 9,885,516 B2
(45) Date of Patent: *Feb. 6, 2018

(54) VACUUM INSULATED DOOR STRUCTURE AND METHOD FOR THE CREATION THEREOF

(71) Applicant: Whirlpool Corporation, Benton Harbor, MI (US)

(72) Inventors: Nihat Cur, St. Joseph, MI (US); Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 204 days.

This patent is subject to a terminal disclaimer.

(21) Appl. No.: 14/635,109

(22) Filed: Mar. 2, 2015

(65) Prior Publication Data

US 2015/0168050 A1 Jun. 18, 2015

Related U.S. Application Data

(63) Continuation of application No. 13/833,696, filed on Mar. 15, 2013, now Pat. No. 9,038,403.

(Continued)

(51) Int. Cl.
*F25D 23/02* (2006.01)
*F25D 23/06* (2006.01)
(Continued)

(52) U.S. Cl.
CPC ............ *F25D 23/065* (2013.01); *B23P 15/26* (2013.01); *B29C 53/00* (2013.01); *F25B 39/00* (2013.01);
(Continued)

(58) Field of Classification Search
CPC .... F25D 23/062; F25D 23/028; F25D 23/063; F25D 11/00; F25D 39/02; F25D 23/065;
(Continued)

(56) References Cited

U.S. PATENT DOCUMENTS

| 948,541 A | 2/1910 | Coleman |
|---|---|---|
| 1,275,511 A | 8/1918 | Welch |

(Continued)

FOREIGN PATENT DOCUMENTS

| CA | 1320631 | 7/1993 |
|---|---|---|
| CA | 2259665 | 1/1998 |

(Continued)

OTHER PUBLICATIONS

Kitchen Aid, "Refrigerator User Instructions," 120 pages, published Sep. 5, 2015.

(Continued)

*Primary Examiner* — Mohammad M Ali
(74) *Attorney, Agent, or Firm* — Price Heneveld LLP

(57) ABSTRACT

A vacuum insulated door structure includes a first wall having a first edge and a barrier layer, a second wall having a second barrier layer and a second edge coupled to the first wall member proximate the first perimetrical edge. The second wall includes at least four inner side walls and a back wall that defines a second wall offset. At least one tubular member extends between the first wall member and the second wall offset, wherein an inner conduit surface of the tubular member provides fluid communication between the first wall outer facing surface and the second wall outer facing surface. A cavity insulation material is disposed within a cavity volume defined between the first and second walls, wherein the cavity volume is hermetically sealed, and wherein the cavity volume includes an at least partial vacuum.

14 Claims, 9 Drawing Sheets

Related U.S. Application Data

(60) Provisional application No. 61/618,914, filed on Apr. 2, 2012.

(51) Int. Cl.
| | |
|---|---|
| *B23P 15/26* | (2006.01) |
| *F25B 39/02* | (2006.01) |
| *F25C 1/00* | (2006.01) |
| *F25B 39/00* | (2006.01) |
| *F25D 11/00* | (2006.01) |
| *B29C 53/00* | (2006.01) |
| *H04R 3/12* | (2006.01) |

(52) U.S. Cl.
CPC .............. *F25B 39/02* (2013.01); *F25C 1/00* (2013.01); *F25D 11/00* (2013.01); *F25D 23/028* (2013.01); *F25D 23/062* (2013.01); *F25D 23/063* (2013.01); *H04R 3/12* (2013.01); *F25D 2201/14* (2013.01); *Y10T 29/49002* (2015.01); *Y10T 29/49359* (2015.01); *Y10T 29/49616* (2015.01); *Y10T 29/49826* (2015.01); *Y10T 29/49879* (2015.01); *Y10T 29/49947* (2015.01); *Y10T 156/1051* (2015.01); *Y10T 428/231* (2015.01)

(58) Field of Classification Search
CPC ...... F25D 2201/14; F29B 39/00; F29B 39/02; F25C 1/00; B29C 53/00; B23P 15/26; Y10T 29/49359; Y10T 29/49002; Y10T 428/231; Y10T 156/1051; Y10T 29/49616; Y10T 29/49947; Y10T 29/49826; Y10T 29/49879
USPC .............................................. 62/340; 312/405
See application file for complete search history.

(56) References Cited

U.S. PATENT DOCUMENTS

| | | |
|---|---|---|
| 1,849,369 A | 3/1932 | Frost |
| 2,108,212 A | 2/1938 | Schellens |
| 2,128,336 A | 8/1938 | Torstensson |
| 2,164,143 A | 6/1939 | Munters |
| 2,318,744 A | 5/1943 | Brown |
| 2,356,827 A | 8/1944 | Coss et al. |
| 2,432,042 A | 12/1947 | Richard |
| 2,439,602 A | 4/1948 | Heritage |
| 2,439,603 A | 4/1948 | Heritage |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Constantini et al. |
| 3,137,900 A | 6/1964 | Carbary |
| 3,218,111 A | 11/1965 | Steiner |
| 3,258,883 A | 7/1966 | Companaro et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,635,536 A | 1/1972 | Lackey et al. |
| 3,688,384 A | 9/1972 | Mizushima et al. |
| 3,868,829 A | 3/1975 | Mann et al. |
| 3,875,683 A | 4/1975 | Waters |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,242,241 A | 12/1980 | Rosen et al. |
| 4,303,732 A | 12/1981 | Torobin |
| 4,325,734 A | 4/1982 | Burrage et al. |
| 4,332,429 A | 6/1982 | Frick et al. |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,660,271 A | 4/1987 | Lenhardt |
| 4,671,909 A | 6/1987 | Torobin |
| 4,671,985 A | 6/1987 | Rodrigues et al. |
| 4,745,015 A | 5/1988 | Cheng et al. |
| 4,777,154 A | 10/1988 | Torobin |
| 4,805,293 A | 2/1989 | Buchser |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,094,899 A | 3/1992 | Rusek, Jr. |
| 5,118,174 A | 6/1992 | Benford et al. |
| 5,157,893 A | 10/1992 | Benson et al. |
| 5,168,674 A | 12/1992 | Molthen |
| 5,175,975 A | 1/1993 | Benson et al. |
| 5,212,143 A | 5/1993 | Torobin |
| 5,221,136 A | 6/1993 | Hauck et al. |
| 5,231,811 A | 8/1993 | Andrepont et al. |
| 5,248,196 A | 9/1993 | Lynn et al. |
| 5,252,408 A | 10/1993 | Bridges et al. |
| 5,263,773 A | 11/1993 | Gable et al. |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,305 A | 3/1996 | Bridges et al. |
| 5,505,810 A | 4/1996 | Kirby et al. |
| 5,507,999 A | 4/1996 | Copsey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,562,154 A | 10/1996 | Benson et al. |
| 5,586,680 A | 12/1996 | Dellby et al. |
| 5,632,543 A * | 5/1997 | McGrath ............... F25D 23/063 220/592.09 |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell et al. |
| 5,792,801 A | 8/1998 | Tsuda et al. |
| 5,813,454 A | 9/1998 | Potter |
| 5,827,385 A | 10/1998 | Meyer et al. |
| 5,843,353 A | 12/1998 | DeVos et al. |
| 5,866,228 A | 2/1999 | Awata |
| 5,868,890 A | 2/1999 | Fredrick |
| 5,900,299 A | 5/1999 | Wynne |
| 5,924,295 A | 7/1999 | Park |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,187,256 B1 | 2/2001 | Aslan et al. |
| 6,209,342 B1 | 4/2001 | Banicevic et al. |
| 6,210,625 B1 | 4/2001 | Matsushita et al. |

(56) References Cited

U.S. PATENT DOCUMENTS

| | | |
|---|---|---|
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,294,595 B1 | 9/2001 | Tyagi et al. |
| 6,305,768 B1 | 10/2001 | Nishimoto |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,460,955 B1 | 10/2002 | Vaughan et al. |
| 6,623,413 B1 | 9/2003 | Wynne |
| 6,651,444 B2 | 11/2003 | Morimoto et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 6,997,530 B2 | 2/2006 | Avendano et al. |
| 7,026,054 B2 | 4/2006 | Ikegawa et al. |
| 7,210,308 B2 | 5/2007 | Tanimoto et al. |
| 7,234,247 B2 | 6/2007 | Maguire |
| 7,278,279 B2 | 10/2007 | Hirai et al. |
| 7,284,390 B2 | 10/2007 | Van Meter et al. |
| 7,296,432 B2 | 11/2007 | Muller et al. |
| 7,316,125 B2 | 1/2008 | Uekado et al. |
| 7,343,757 B2 | 3/2008 | Egan et al. |
| 7,386,992 B2 | 6/2008 | Adamski et al. |
| 7,449,227 B2 | 11/2008 | Echigoya et al. |
| 7,475,562 B2 | 1/2009 | Jackovin |
| 7,517,576 B2 | 4/2009 | Echigoya et al. |
| 7,537,817 B2 | 5/2009 | Tsunetsugu et al. |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,703,217 B2 | 4/2010 | Tada et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,861,538 B2 | 1/2011 | Welle et al. |
| 7,886,559 B2 | 2/2011 | Hell et al. |
| 7,893,123 B2 | 2/2011 | Luisi |
| 7,905,614 B2 | 3/2011 | Aoki |
| 7,908,873 B1 | 3/2011 | Cur et al. |
| 7,930,892 B1 | 4/2011 | Vonderhaar |
| 7,938,148 B2 | 5/2011 | Carlier et al. |
| 8,083,985 B2 | 12/2011 | Luisi et al. |
| 8,113,604 B2 | 2/2012 | Olson et al. |
| 8,117,865 B2 | 2/2012 | Allard et al. |
| 8,163,080 B2 | 4/2012 | Meyer et al. |
| 8,176,746 B2 | 5/2012 | Allard et al. |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,545 B2 | 10/2012 | Chen et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,453,476 B2 | 6/2013 | Kendall et al. |
| 8,456,040 B2 | 6/2013 | Allard et al. |
| 8,522,563 B2 | 9/2013 | Allard et al. |
| 8,528,284 B2 | 9/2013 | Aspenson et al. |
| 8,726,690 B2 | 5/2014 | Cur et al. |
| 8,733,123 B2 | 5/2014 | Adamski et al. |
| 8,739,567 B2 | 6/2014 | Junge |
| 8,739,568 B2 | 6/2014 | Allard et al. |
| 8,752,918 B2 | 6/2014 | Kang |
| 8,756,952 B2 | 6/2014 | Adamski et al. |
| 8,770,682 B2 | 7/2014 | Lee et al. |
| 8,776,390 B2 | 7/2014 | Hanaoka et al. |
| 8,790,477 B2 | 7/2014 | Tenra et al. |
| 8,852,708 B2 | 10/2014 | Kim et al. |
| 8,871,323 B2 | 10/2014 | Kim et al. |
| 8,881,398 B2 | 11/2014 | Hanley et al. |
| 8,899,068 B2 | 12/2014 | Jung et al. |
| 8,927,084 B2 | 1/2015 | Jeon et al. |
| 8,944,541 B2 | 2/2015 | Allard et al. |
| 8,986,483 B2 | 3/2015 | Cur et al. |
| RE45,501 E | 5/2015 | Maguire |
| 9,102,076 B2 | 8/2015 | Doshi et al. |
| 9,140,480 B2 | 9/2015 | Kuehl et al. |
| 9,252,570 B2 | 2/2016 | Allard et al. |
| 9,328,951 B2 | 5/2016 | Shin et al. |
| 9,463,917 B2 | 10/2016 | Wu et al. |
| 2002/0168496 A1 | 11/2002 | Morimoto et al. |
| 2003/0008100 A1 | 1/2003 | Horn |
| 2004/0178707 A1 | 9/2004 | Avendano |
| 2004/0180176 A1 | 9/2004 | Rusek |
| 2004/0253406 A1 | 12/2004 | Hayashi et al. |
| 2005/0235682 A1 | 10/2005 | Hirai et al. |
| 2006/0076863 A1 | 4/2006 | Echigoya et al. |
| 2006/0201189 A1 | 9/2006 | Adamski et al. |
| 2006/0263571 A1 | 11/2006 | Tsunetsugu et al. |
| 2007/0001563 A1 | 1/2007 | Park et al. |
| 2007/0099502 A1 | 5/2007 | Ferinauer |
| 2007/0176526 A1 | 8/2007 | Gomoll et al. |
| 2007/0266654 A1 | 11/2007 | Noale |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Neumann |
| 2009/0058244 A1 | 3/2009 | Cho et al. |
| 2009/0113925 A1 | 5/2009 | Korkmaz |
| 2009/0179541 A1 | 7/2009 | Smith et al. |
| 2009/0324871 A1 | 12/2009 | Henn |
| 2010/0231109 A1 | 9/2010 | Matzke et al. |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0315693 A1 | 12/2011 | Cur et al. |
| 2012/0000234 A1 | 1/2012 | Adamski et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCracken |
| 2012/0273111 A1 | 11/2012 | Nomura et al. |
| 2012/0279247 A1 | 11/2012 | Katu et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0033163 A1 | 2/2013 | Kang |
| 2013/0068990 A1 | 3/2013 | Eilbracht et al. |
| 2013/0111941 A1 | 5/2013 | Yu et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0270732 A1 | 10/2013 | Wu et al. |
| 2013/0305535 A1 | 11/2013 | Cur et al. |
| 2014/0132144 A1 | 5/2014 | Kim et al. |
| 2014/0171578 A1 | 6/2014 | Meyer et al. |
| 2014/0260332 A1 | 9/2014 | Wu |
| 2014/0346942 A1 | 11/2014 | Kim et al. |
| 2014/0364527 A1 | 12/2014 | Matthias et al. |
| 2015/0027628 A1 | 1/2015 | Cravens et al. |

(56) References Cited

U.S. PATENT DOCUMENTS

| | | | |
|---|---|---|---|
| 2015/0147514 | A1 | 5/2015 | Shinohara et al. |
| 2015/0168050 | A1 | 6/2015 | Cur et al. |
| 2015/0190840 | A1 | 7/2015 | Muto et al. |
| 2016/0240839 | A1 | 8/2016 | Umeyama et al. |
| 2016/0258671 | A1 | 9/2016 | Allard et al. |

FOREIGN PATENT DOCUMENTS

| | | | |
|---|---|---|---|
| CA | 2640006 | | 8/2007 |
| CN | 1158509 | | 7/2004 |
| CN | 1970185 | | 5/2007 |
| CN | 100359272 | | 1/2008 |
| CN | 101437756 | | 5/2009 |
| CN | 201680116 | | 12/2010 |
| CN | 102296714 | | 5/2012 |
| CN | 102452522 | | 5/2012 |
| CN | 102717578 | A | 10/2012 |
| CN | 102720277 | | 10/2012 |
| CN | 103072321 | | 5/2013 |
| CN | 203331442 | | 12/2013 |
| CN | 104816478 | A | 8/2015 |
| DE | 1150190 | | 6/1963 |
| DE | 4110292 | A1 | 10/1992 |
| DE | 19818890 | | 11/1999 |
| DE | 19915311 | | 10/2000 |
| DE | 102008026528 | | 12/2009 |
| DE | 102009046810 | | 5/2011 |
| DE | 102010024951 | | 12/2011 |
| DE | 102011051178 | A1 | 12/2012 |
| DE | 102012223536 | | 6/2014 |
| DE | 102012223541 | | 6/2014 |
| EP | 0260699 | | 3/1988 |
| EP | 0480451 | | 4/1992 |
| EP | 0691518 | | 1/1996 |
| EP | 0860669 | | 8/1998 |
| EP | 1087186 | | 3/2001 |
| EP | 1200785 | | 5/2002 |
| EP | 1243880 | | 9/2002 |
| EP | 1496322 | | 1/2005 |
| EP | 1505359 | | 2/2005 |
| EP | 1602425 | A1 | 12/2005 |
| EP | 1484563 | | 10/2008 |
| EP | 2342511 | | 8/2012 |
| EP | 2607073 | | 6/2013 |
| EP | 2789951 | | 10/2014 |
| FR | 2980963 | | 4/2013 |
| FR | 2991698 | A1 | 12/2013 |
| GB | 837929 | | 6/1960 |
| GB | 1214548 | | 6/1960 |
| JP | 4828353 | | 8/1973 |
| JP | 51057777 | | 5/1976 |
| JP | 59191588 | | 12/1984 |
| JP | 03013779 | | 1/1991 |
| JP | 06159922 | | 6/1994 |
| JP | 7001479 | | 1/1995 |
| JP | H07167377 | | 7/1995 |
| JP | 08300052 | | 11/1996 |
| JP | H08303686 | | 11/1996 |
| JP | H09166271 | | 6/1997 |
| JP | 10113983 | | 5/1998 |
| JP | 11311395 | | 11/1999 |
| JP | 11336990 | | 12/1999 |
| JP | 2000097390 | | 4/2000 |
| JP | 2000117334 | | 4/2000 |
| JP | 2001038188 | | 2/2001 |
| JP | 2001116437 | | 4/2001 |
| JP | 2001336691 | | 12/2001 |
| JP | 2001343176 | | 12/2001 |
| JP | 03478771 | | 12/2003 |
| JP | 2004303695 | | 10/2004 |
| JP | 2005114015 | | 4/2005 |
| JP | 2005164193 | | 6/2005 |
| JP | 2005256849 | | 9/2005 |
| JP | 2006077792 | | 3/2006 |
| JP | 2006161945 | | 6/2006 |
| JP | 03792801 | | 7/2006 |
| JP | 2006200685 | A | 8/2006 |
| JP | 2007263186 | | 10/2007 |
| JP | 4111096 | | 7/2008 |
| JP | 2008157431 | | 7/2008 |
| JP | 2009063064 | | 3/2009 |
| JP | 2009162402 | | 7/2009 |
| JP | 2009524570 | | 7/2009 |
| JP | 2010017437 | | 1/2010 |
| JP | 2010071565 | | 4/2010 |
| JP | 2010108199 | | 5/2010 |
| JP | 2010145002 | | 7/2010 |
| JP | 04545126 | B2 | 9/2010 |
| JP | 2010236770 | | 10/2010 |
| JP | 2010276309 | | 12/2010 |
| JP | 2011002033 | | 1/2011 |
| JP | 2011069612 | | 4/2011 |
| JP | 04779684 | | 9/2011 |
| JP | 2011196644 | | 10/2011 |
| JP | 2012026493 | | 2/2012 |
| JP | 04897473 | | 3/2012 |
| JP | 2012063029 | | 3/2012 |
| JP | 2012087993 | | 5/2012 |
| JP | 2012163258 | | 8/2012 |
| JP | 2012189114 | | 10/2012 |
| JP | 2012242075 | | 12/2012 |
| JP | 2013002484 | | 1/2013 |
| JP | 2013050242 | | 3/2013 |
| JP | 2013088036 | | 5/2013 |
| JP | 2013195009 | | 9/2013 |
| KR | 20020057547 | | 7/2002 |
| KR | 20020080938 | | 10/2002 |
| KR | 20030083812 | | 11/2003 |
| KR | 20040000126 | | 1/2004 |
| KR | 100620025 | B1 | 9/2006 |
| KR | 20070044024 | | 4/2007 |
| KR | 1020080103845 | | 11/2008 |
| KR | 20090026045 | | 3/2009 |
| KR | 1017776 | | 2/2011 |
| KR | 20120007241 | | 1/2012 |
| KR | 2012046621 | | 5/2012 |
| KR | 2012051305 | | 5/2012 |
| RU | 2077411 | C1 | 4/1997 |
| RU | 2132522 | C1 | 6/1999 |
| RU | 2162576 | C2 | 1/2001 |
| RU | 2234645 | C1 | 8/2004 |
| RU | 2252377 | | 5/2005 |
| RU | 2349618 | C2 | 3/2009 |
| RU | 2571031 | | 12/2015 |
| SU | 30476407 | A1 | 7/1975 |
| SU | 01307186 | A1 | 4/1987 |
| WO | 1998049506 | | 11/1998 |
| WO | 02060576 | A1 | 4/1999 |
| WO | 9614207 | A1 | 4/1999 |
| WO | 9920961 | A1 | 4/1999 |
| WO | 9920964 | A1 | 4/1999 |
| WO | 199920964 | | 4/1999 |
| WO | 200160598 | | 8/2001 |
| WO | 200202987 | | 1/2002 |
| WO | 2002052208 | | 4/2002 |
| WO | 03089729 | | 10/2003 |
| WO | 2006045694 | | 5/2006 |
| WO | 2007085511 | | 8/2007 |
| WO | 2008122483 | A2 | 10/2008 |
| WO | 2009013106 | A2 | 1/2009 |
| WO | 2009112433 | A1 | 9/2009 |
| WO | 2009147106 | | 12/2009 |
| WO | 2010007783 | A1 | 1/2010 |
| WO | 2010029730 | | 3/2010 |
| WO | 2010043009 | | 4/2010 |
| WO | 2010092627 | | 8/2010 |
| WO | 2010127947 | | 11/2010 |
| WO | 2011003711 | | 1/2011 |
| WO | 2011058678 | | 5/2011 |
| WO | 2011081498 | | 7/2011 |
| WO | 2012023705 | | 2/2012 |
| WO | 2012026715 | | 3/2012 |
| WO | 2012031885 | | 3/2012 |
| WO | 2012044001 | | 4/2012 |

(56) References Cited

FOREIGN PATENT DOCUMENTS

| WO | 2012043990 | 5/2012 |
| WO | 2012085212 | 6/2012 |
| WO | 2012119892 | 9/2012 |
| WO | 2014038150 | 3/2014 |
| WO | 2014095542 | 6/2014 |
| WO | 2014121893 A1 | 8/2014 |
| WO | 2014184393 | 11/2014 |
| WO | 2016082907 A1 | 6/2016 |

OTHER PUBLICATIONS

BASF, "Balindur™ Solutions for fixing Vaccum Insulated Panels," web page, 4 pages, date unknown, http://performance-materials.basf.us/products/view/family/balindur, at least as early as Dec. 21, 2015.

BASF, "Balindur™," web page, 2 pages, date unknown, http://product-finder.basf.com/group/corporate/product-finder/en/brand/BALINDUR, at least as early as Dec. 21, 2015.

PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.

European Search Report, Application No. 14158615.6, Jun. 24, 2015, 5 pages.

European Extended Search Report dated Jun. 22, 2015 regarding European Patent Application No. 14158619.8 filed Mar. 10, 2014.

European Extended Search Report dated Dec. 14, 2015 regarding European Patent Application No. 13775196.2 filed Apr. 11, 2013.

International Patent Application No. PCT/US2013036203, filed Apr. 11, 2013, Applicant: Whirlpool Corporation, International Search Report and Opinion dated Jul. 26, 2013.

European Patent Application No. 14158608.1 filed Mar. 10, 2014, Applicant: Whirlpool Corporation, European Search re: same, dated Oct. 14, 2014.

\* cited by examiner

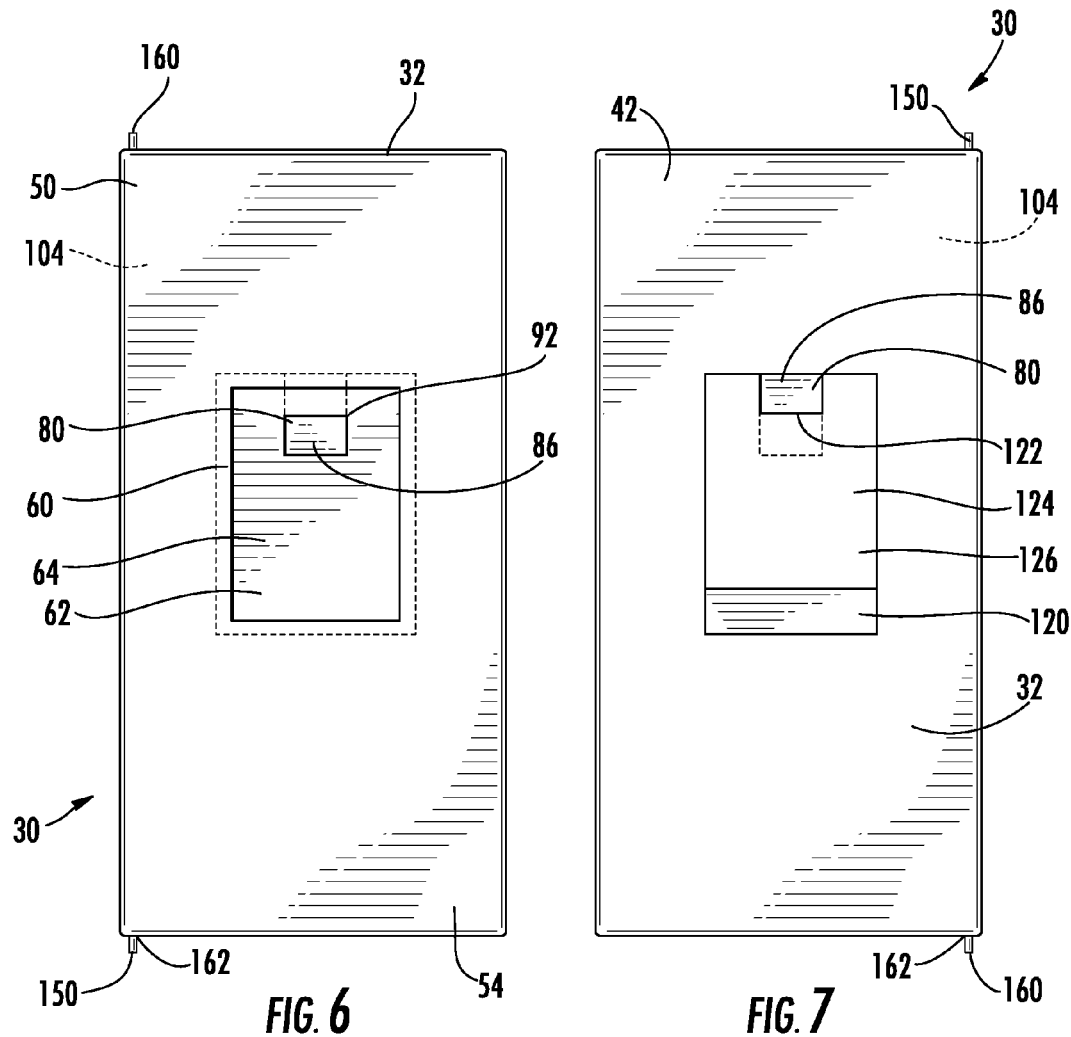

VACUUM INSULATED DOOR STRUCTURE AND METHOD FOR THE CREATION THEREOF

CROSS-REFERENCE TO RELATED APPLICATIONS

The present application is a continuation of U.S. patent application Ser. No. 13/833,696 filed Mar. 15, 2013, entitled VACUUM INSULATED DOOR STRUCTURE AND METHOD FOR THE CREATION THEREOF, which claims priority to U.S. Provisional Patent Application Ser. No. 61/618,914, filed on Apr. 2, 2012, entitled ENERGY EFFICIENT HOME APPLIANCES.

The present application is also related to U.S. patent application Ser. No. 13/833,635 filed Mar. 15, 2013, entitled A METHOD TO CREATE VACUUM INSULATED CABINETS FOR REFRIGERATORS; and U.S. patent application Ser. No. 13/836,669 filed Mar. 15, 2013, entitled FOLDED VACUUM INSULATED STRUCTURE; and U.S. patent application Ser. No. 13/835,449 filed Mar. 15, 2013, entitled A VACUUM PANEL CABINET STRUCTURE FOR A REFRIGERATOR, now U.S. Pat. No. 8,944,541; and U.S. patent application Ser. No. 13/832,246 filed Mar. 15, 2013, entitled DUAL COOLING SYSTEMS TO MINIMIZE OFF-CYCLE MIGRATION LOSS IN REFRIGERATORS WITH A VACUUM INSULATED STRUCTURE; and U.S. patent application Ser. No. 13/836,143 filed Mar. 15, 2013, entitled VACUUM INSULATED STRUCTURE TUBULAR CABINET CONSTRUCTION; and U.S. patent application Ser. No. 13/837,659 filed Mar. 15, 2013, entitled FOLDED VACUUM INSULATED STRUCTURE; and U.S. patent application Ser. No. 13/833,685 filed Mar. 15, 2013, entitled METHOD TO CREATE VACUUM INSULATED CABINETS FOR REFRIGERATORS, all of which are incorporated herein by reference in their entirety.

FIELD OF THE INVENTION

The invention is in the field of vacuum insulated door panels and methods for creating vacuum insulated door panels for use in refrigerators.

SUMMARY

In one aspect, a vacuum insulated door structure includes a first wall member having a first perimetrical edge, at least four outer sidewalls that extend substantially perpendicular from the first perimetrical edge and to a perimetrical lip, a first inner facing surface and a first outer facing surface. A second wall member includes a second inner facing surface, a second outer facing surface and a second perimetrical edge coupled to the first wall member proximate the perimetrical lip, wherein the second wall member comprises at least four inner side walls defining a second wall opening distal from at least a portion of the second perimetrical edge, and wherein the at least four inner sidewalls extend from the second wall opening toward the first wall member to a back wall, wherein the at least four sidewalls and the back wall define a second wall offset. At least one tubular member has first and second conduit ends, an inner conduit surface and an outer conduit surface, wherein the first conduit end is coupled to a first wall conduit opening defined by the first wall member and the second conduit end is coupled to a second wall conduit opening defined by the second wall offset, and wherein the inner conduit surface provides a fluid communication between the first wall outer facing surface and the second wall outer facing surface, and wherein the first and second wall members and the at least one tubular member form a door structure. A barrier layer includes a hermetic barrier film and a heat sealing layer disposed on at least a portion of the first and second wall members and the tubular member. A cavity insulation material is disposed within a cavity volume defined by an interior volume of the door structure, wherein the cavity volume is hermetically sealed, wherein the cavity volume includes an at least partial vacuum.

In another aspect, a refrigerator having a vacuum insulated door structure comprises an insulative first wall member having a first perimetrical edge, a first inner facing surface and a first outer facing surface, wherein the first wall member comprises at least four offset sidewalls defining a first wall opening distal from at least a portion the first perimetrical edge, and wherein the at least four offset sidewalls extend substantially orthogonally from the first wall opening to a first back wall, wherein the at least four offset sidewalls and the first back wall include a first wall offset. An insulative perimetrical flange has a first lip and a second lip, wherein the first lip is coupled to the first wall member proximate the first perimetrical edge. An insulative second wall member has a second inner facing surface, a second outer facing surface, and a second perimetrical edge coupled to the perimetrical flange proximate the second lip, wherein the second wall member comprises at least four inner side walls defining a second wall opening distal from at least a portion of the second perimetrical edge, and wherein the at least four inner sidewalls extend from the second wall opening toward the first wall member to a second back wall, wherein the at least four inner sidewalls and the second back wall include a second wall offset disposed proximate the first wall opening. An insulative tubular member has first and second conduit ends, an inner conduit surface, and an outer conduit surface, wherein the first conduit end is coupled to the first wall member proximate a first wall conduit opening defined by the first wall offset and the second conduit end is coupled to the second wall member proximate a second wall conduit opening defined by the second wall offset, and wherein the inner conduit surface provides a fluid communication between the first wall outer facing surface and the second wall outer facing surface, and wherein the first and second wall members, the perimetrical flange, and the tubular member form a door structure. A barrier layer includes a hermetic barrier film and a heat sealing layer disposed on at least a portion of the first and second wall members, the perimetrical flange, and the tubular member. A cavity insulation material is disposed within a cavity volume defined by the inner facing surface of the first wall member, the inner facing surface of the second wall member, the perimetrical flange, and the outer conduit surface, wherein the cavity volume is hermetically sealed and is configured to maintain an at least partial vacuum within the cavity volume.

In yet another aspect, a method for creating an integral vacuum insulated door structure includes providing a first wall member having a first perimetrical edge, at least four outer sidewalls that extend substantially perpendicular from the first perimetrical edge to a perimetrical lip, a first inner facing surface, and a first outer facing surface, wherein the first wall member comprises at least four offset sidewalls defining a first wall opening distal from at least a portion of the first perimetrical edge, and wherein the at least four offset sidewalls extend substantially orthogonally from the first wall opening to a first back wall, wherein the at least four offset sidewalls and the first back wall include a first wall offset. A second wall member includes a second inner facing surface, a second outer facing surface, and a second perimetrical edge disposed proximate the perimetrical lip, wherein the second wall member comprises at least four inner sidewalls defining a second wall opening distal from at least a portion of the second perimetrical edge, and wherein the at least four inner sidewalls extend from the second wall opening toward the first wall member to a back wall, wherein the at least four sidewalls and the back wall define a second wall offset. A tubular member includes first and second conduit ends, an inner conduit surface and an outer conduit surface, wherein the first conduit end is disposed to a first wall conduit opening defined by the first wall member and the second conduit end is disposed to a second wall conduit opening defined by the second wall offset, and wherein the inner conduit surface provides a fluid communication between the first wall outer facing surface and the second wall outer facing surface. A barrier layer comprises a hermetic barrier film and a heat sealing layer on at least a portion of the first and second wall members, and the tubular member. A cavity insulation material is disposed within a cavity volume defined by the inner facing surface of the first wall member, the inner facing surface of the second wall member, and the outer conduit surface. The cavity volume is hermetically sealed. Gas is extracted from the cavity volume via at least one port disposed on the first wall member proximate a port opening defined by the first wall member, wherein the cavity volume is configured to maintain an at least partial vacuum within the cavity volume.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 6 is a front elevational view of the vacuum insulated door structure of FIG. 3;

FIG. 7 is a rear elevational view of the vacuum insulated door structure of FIG. 3;

DETAILED DESCRIPTION OF EMBODIMENTS

Figure 1:
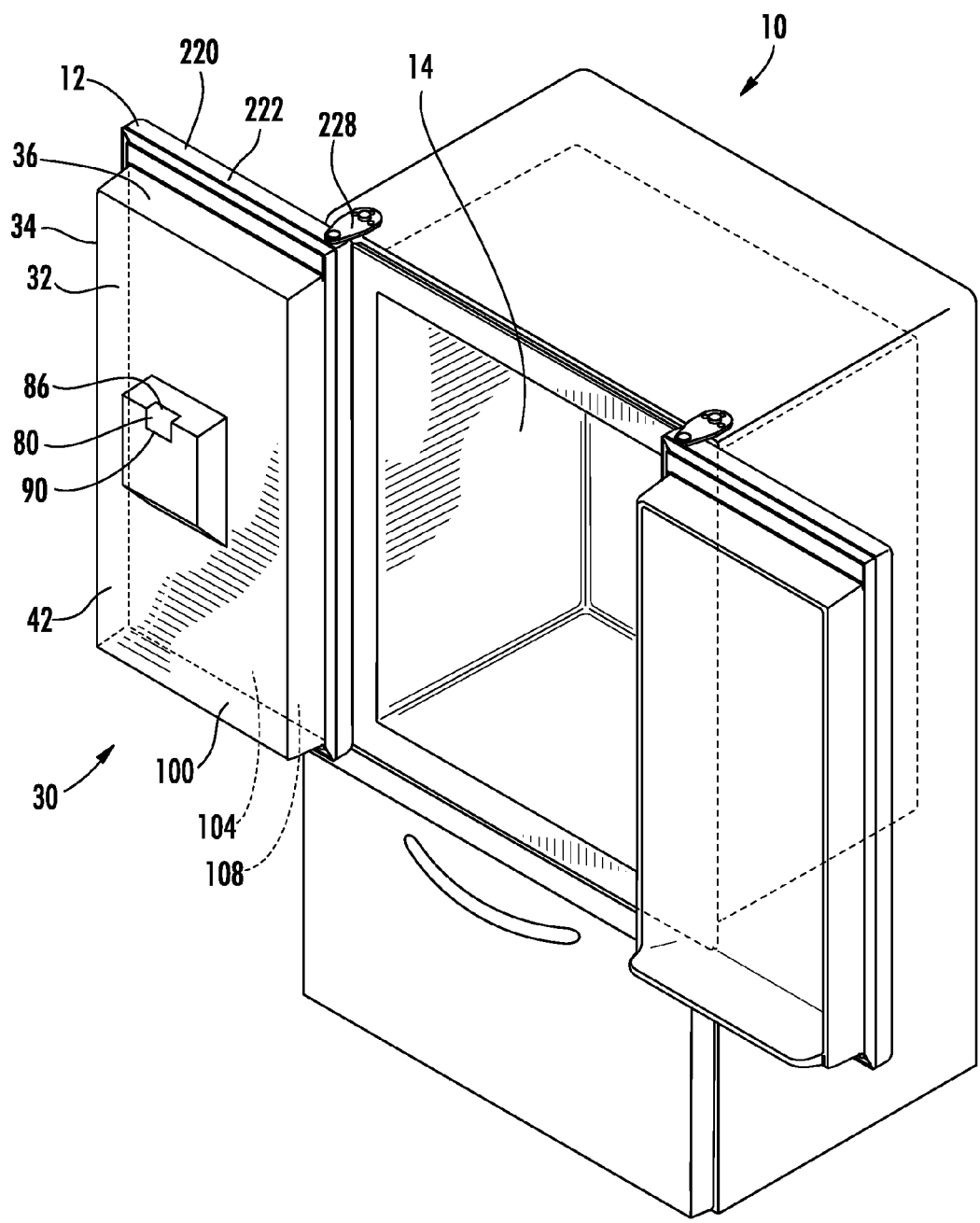
FIG. 1 is a top perspective of a refrigerator containing one embodiment of the vacuum insulated door structure with the door in the open position.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With respect to FIG. 1, a refrigerator 10 is generally shown. In each of these embodiments, the refrigerator 10 can have at least one door 12 operable between open and closed positions, and an interior 14 wherein the door 12 selectively provides access to the interior 14 of the refrigerator 10 when the door 12 is in the open position. As will be more fully described below, the refrigerator 10 can also include a cooling loop having an evaporator, a condenser, and/or coolant fluid that can be configured to provide cooling to at least a portion of the door 12.

A first aspect, as illustrated in FIGS. 1-5, includes a vacuum insulated door structure 30 that can be disposed within the at least one door 12 of the refrigerator 10. The vacuum insulated door structure 30 includes a first wall member 32 having a first perimetrical edge 34 and at least four outer side walls 36 that extend substantially perpendicular from the first perimetrical edge 34 to a perimetrical lip 38. The first wall member 32 also includes a first inner facing surface 40 and a first outer facing surface 42.

Figure 3:
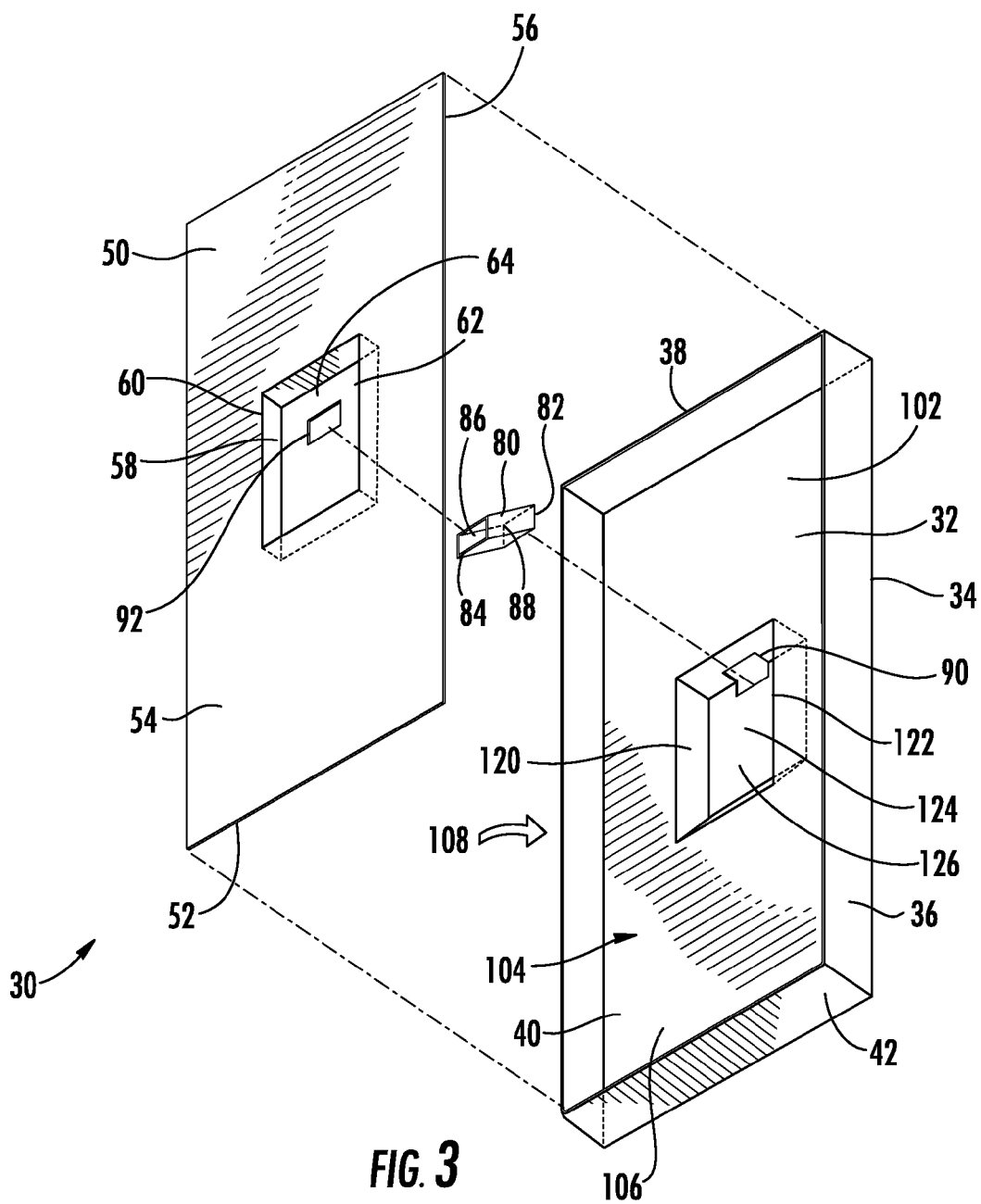
FIG. 3 is a bottom exploded perspective view of one embodiment of the vacuum insulated door structure.

As shown in FIG. 3, the vacuum insulated door structure 30 also includes a second wall member 50 having a second inner facing surface 52 and a second outer facing surface 54, and a second perimetrical edge 56. The second perimetrical edge 56 is coupled to the first wall member 32 proximate the perimetrical lip 38. At least four inner sidewalls 58 are included in the second wall member 50 and define a second wall opening 60 configured to be distal from at least a portion of the second perimetrical edge 56. The at least four inner sidewalls 58 extend from the second wall opening 60 toward the first wall member 32 to a back wall 62. The at least four inner sidewalls 58 and the back wall 62 define a second wall offset 64.

Figure 4:
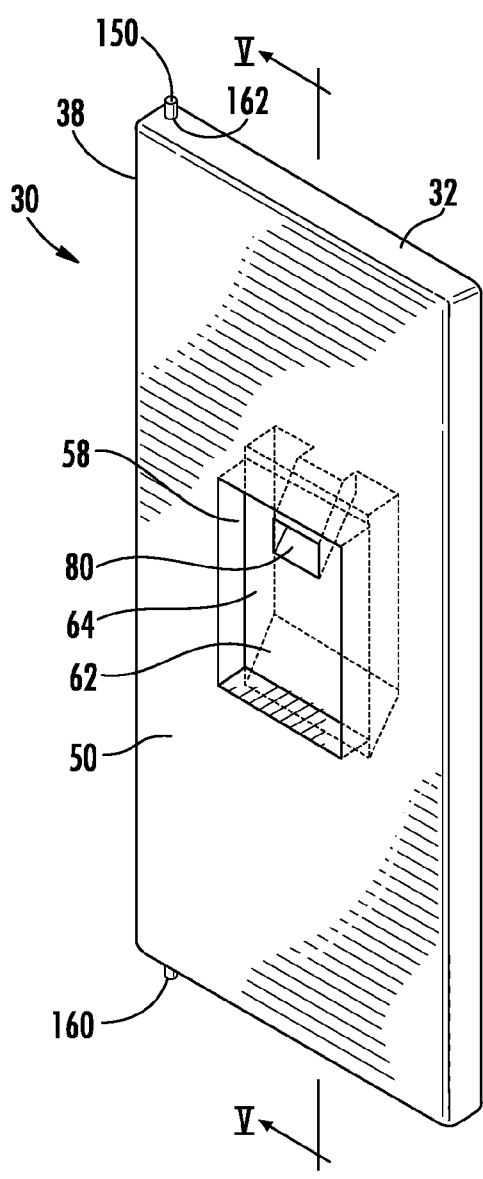
FIG. 4 is a top perspective of the vacuum insulated door structure of FIG. 3.
Figure 5:
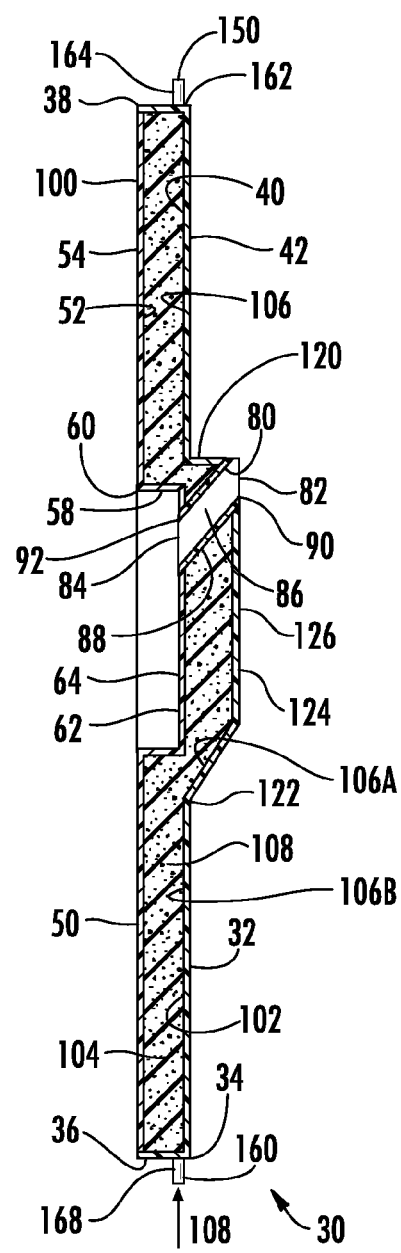
FIG. 5 is a cross-sectional view of the vacuum insulated door structure of FIG. 4 taken at line V-V.
Figure 8:
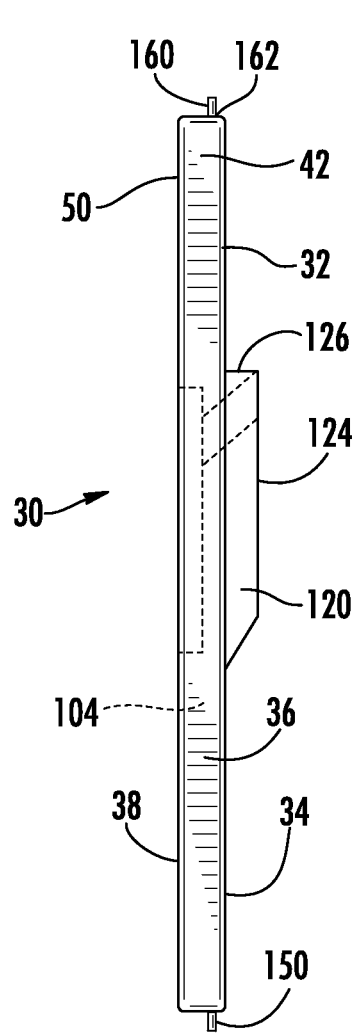
FIG. 8 is a side elevational view of the vacuum insulated door structure of FIG. 3.
Figure 9:
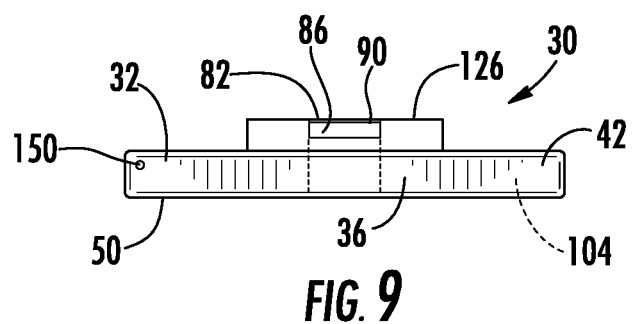
FIG. 9 is a top plan view of the vacuum insulated door structure of FIG. 3.
Figure 10:
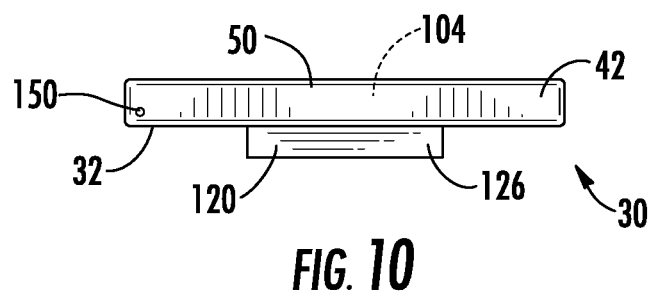
FIG. 10 is a bottom plan view of the vacuum insulated door structure of FIG. 3.

As shown in FIGS. 3-5, the vacuum insulated door structure 30 can include at least one tubular member 80 that includes first and second conduit ends 82, 84, an inner conduit surface 86 and an outer conduit surface 88. The first conduit end 82 is coupled to a first wall conduit opening 90 defined by the first wall member 32 and the second conduit end 84 is coupled to a second wall conduit opening 92 defined by the second wall offset 64. In this manner, the inner conduit surface 86 provides a fluid communication between the first outer facing surface 42 and the second outer facing surface 54.

The first and second wall members 32, 50 and the at least one tubular member 80 form the vacuum insulated door structure 30 that includes an outside surface 100 and an inside surface 102, wherein the inside surface 102 defines a cavity volume 104 that is hermetically sealed. A barrier layer 106 comprising a hermetic barrier film 106A and a heat sealing layer 106B are disposed on at least a portion of the first and second wall members 32, 50 and the tubular member 80. A cavity insulation material 108 is also disposed within the cavity volume 104 and the cavity volume 104 is configured to maintain at least partial vacuum within the cavity volume 65.

According to one embodiment, the first and second wall members 32, 50 and the at least one tubular member 80 can be made of materials that include, but are not limited to, high impact polystyrene or acrylonitrile butadiene styrene that has been thermally formed into the shape described above. While not preferred, it is understood that the first and second wall members 32, 50 and the at least one tubular member 80 can also be formed by attaching various members together to form the vacuum insulated door structure 30, as described above.

Referring to the illustrated embodiment, as illustrated in FIGS. 3 and 5, the first wall member 32 can include at least four offset sidewalls 120 that define a first wall opening 122 configured to be distal from at least a portion of the first perimetrical edge 34, and wherein the at least four offset sidewalls 120 extend substantially orthogonally from the first wall opening 122 to an offset back wall 124, such that the offset inner sidewalls 120 and the offset back wall 124 includes a first wall offset 126. In this embodiment, the offset back wall 124 of the first offset is disposed proximate the back wall 62 of the second wall offset 64. In addition, the at least one tubular member 80 is coupled to the first wall member 32 proximate the first wall conduit opening 90 defined by the first wall offset 126, and extends to the second conduit end 84 which is coupled to the second wall member 50 proximate the second wall conduit opening 92, defined by the second wall offset 64.

Referring now to FIGS. 3-5 of the illustrated embodiment, the barrier layer 106 disposed on the first and second wall members 32, 50 and the at least one tubular member 80 can include at least one layer of polymeric barrier films and at least one heat sealing layer 106B. The one or more polymeric barrier films can include, but are not limited to, ethylene vinyl alcohol co-polymer, or polyvinylidene chloride films. The barrier layer 106 can be disposed upon the first and second wall members 32, 50 and the at least one tubular member 80 by thermally forming the barrier layer 106 onto the first and second wall members 32, 50 and the at least one tubular member 80 by methods that include, but are not limited to, laminating, co-extruding, or coating the barrier layer 106 onto the first and second wall members 32, 50 and the at least one tubular member 80. Alternatively, these and other methods can be used to dispose the barrier layer 106 onto panels that will be formed into the first and second wall members 32, 50 and the at least one tubular member 80.

In various embodiments, the barrier layer 106 provides a hermetic surface to the first and second wall members 32, 50 and the at least one tubular member 80 to increase the ability of the vacuum insulated door structure 30 to retain a vacuum within the cavity volume 104. The barrier layer 106 can be disposed on the first inner facing surface 40 of the first wall member 32, the second inner facing surface 52 of the second wall member 50, and the outer conduit surface 88 of the at least one tubular member 80, whereby the barrier layer 106 is disposed proximate the cavity volume 104 and substantially seals the cavity volume 104. In this manner, the barrier layer 106, being within the cavity volume 104, is substantially protected from damage that can be caused by handling and installation of the vacuum insulated door structure 30 within the refrigerator 10. In less preferred embodiments, the barrier layer 106 can be disposed on the first outer facing surface 42 of the first wall member 32, the second outer facing surface 54 of the second wall member 50, and the inner conduit surface 86 of the at least one tubular member 80.

In other alternate embodiments, the vacuum insulated door structure 30 can be formed by disposing a perimetrical flange having a first lip and a second lip to the first wall member 32 and the second wall member 50, such that the first lip is coupled to the first wall member 32 proximate the first perimetrical edge 34 and the second lip is coupled to the second wall member 50 proximate the second perimetrical edge 56. In this embodiment, the at least four outer sidewalls 36 make up the perimetrical flange.

As illustrated in FIG. 5, the cavity insulation material 108 disposed within the cavity volume 104 can be a low thermal conductivity material or polyurethane foam that is disposed into the cavity volume 104. As will be discussed more fully below, the cavity insulation material 108 can be disposed within the cavity volume 104 either before or after the first wall member 32 is hermetically sealed to the second wall member 50. In addition, the cavity insulation material 108 can be an injectable or loose material that can be injected into the cavity volume 104 through at least one port 150. In alternate embodiments, the cavity insulation material 108 can be a preformed substantially rigid material, where the preformed shape of the cavity insulation material 108 typically and substantially matches the shape of the cavity volume 104. In such an embodiment, the preformed cavity insulation material 108 is configured to be received by the first inner facing surface 40 of the first wall member 32, and is further configured to receive the second inner facing surface 52 of the second wall member 50. The preformed cavity insulation material 108 can also be configured to receive the at least one tubular member 80 and the first and second wall offsets 126, 64. In this manner, the preformed cavity insulation material 108 substantially fills the cavity volume 104 without having to inject the cavity insulation material 108. In addition, the preformed cavity insulation material 108 can allow the manufacturer to inspect the quality of the cavity insulation material 108 before installation to substantially insure that the cavity insulation material 108 is disposed substantially throughout the cavity volume 104.

Referring again to the embodiment illustrated in FIGS. 3-10, and as discussed above, the first wall member 32, the second wall member 50, and the at least one tubular member 80 are hermetically sealed together to form the vacuum insulated door structure 30 and the cavity volume 104 defined therein. It should be understood that the method for sealing the cavity volume 104 can vary. The methods used in the various embodiments are sufficient to hermetically seal the cavity volume 104 in order to maintain the desired vacuum within the cavity volume 104 of the vacuum insulated door structure 30. These sealing methods can include, but are not limited to, heat sealing or ultrasonic welding. The combination of the polymeric barrier films and the at least one heat sealing layer 106B in conjunction with the method of sealing the cavity volume 104 creates an at least partial vacuum within the core cavity volume 104 that can be maintained for extended periods of time, such as, at least five, ten, or fifteen years.

Referring now to the illustrated embodiment as illustrated in FIGS. 4-11, the at least one port 150 can be disposed to the first outer facing surface 42 of the first wall member 32. The at least one port 150 can include an extruded tube 160 that can be attached to a port opening 162 defined by a portion of the first or second wall members 32, 50. The port 150 provides a fluid communication between the outside of the vacuum insulated door structure 30 and the cavity volume 104, so that material can be passed from within the cavity volume 104 to the outside of the vacuum insulated door structure 30, or vice versa.

As illustrated in FIG. 5, after the cavity volume 104 is sealed together, the port 150 can be used as a vacuum port 164 to draw out gas 166 that may be present in the cavity volume 104 with the cavity insulation material 108. Once the desired amount of gas 166 is extracted from the cavity volume 104, the port 150 can be removed, and the port opening 162 in the first or second wall member 32, 50 can be closed and hermetically sealed to maintain the desired vacuum within the cavity volume 104. It should be understood that in various embodiments, more than one port 150 can be used to extract gas 166 from the cavity volume 104.

Figure 11:
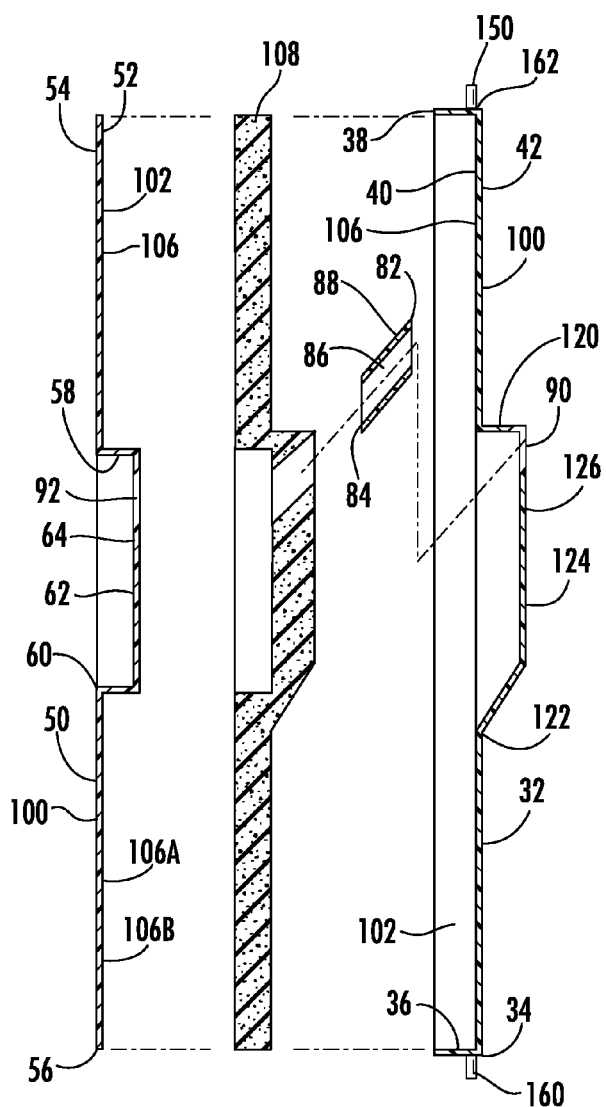
FIG. 11 is an exploded cross-sectional view of the vacuum insulated door structure of FIG. 5.

Referring again to the illustrated embodiment as shown in FIGS. 3, 5 and 11, the cavity insulation material 108 can be disposed within the cavity volume 104 either before or after the first wall member 32 is hermetically sealed to the second wall member 50. Where the cavity insulation material 108 is disposed within the cavity volume 104 after the cavity volume 104 is hermetically sealed, at least one injection port 168 can be disposed to the outside surface 100 of the vacuum insulated door structure 30 at the one or more port openings 162 defined therein so that there can be a fluid communication between the outside surface 100 of the vacuum insulated door structure 30 and the cavity volume 104. The cavity insulation material 108 can then be injected through the at least one injection port 168 into the cavity volume 104. The at least one vacuum port 164 can also be disposed on the outside surface 100 of the vacuum insulated door structure 30 as described above to extract the desired amount of gas 166 from the cavity volume 104, and to aid in the injection of the cavity insulation material 108 throughout the cavity volume 104. Once the desired amount of cavity insulation material 108 is injected into the cavity volume 104, and the desired amount of gas 166 is extracted from the cavity volume 104, the injection port 168 and the vacuum port 164 can be removed, and the port openings 162 closed and hermetically sealed to maintain the desired vacuum within the cavity volume 104.

It should be appreciated that a perfect vacuum is not necessary within the hermetically sealed cavity volume 104. Various levels of gas 166 can remain within the cavity volume 104 without degrading the efficiency or effectiveness of the vacuum insulated door structure 30.

Figure 12:
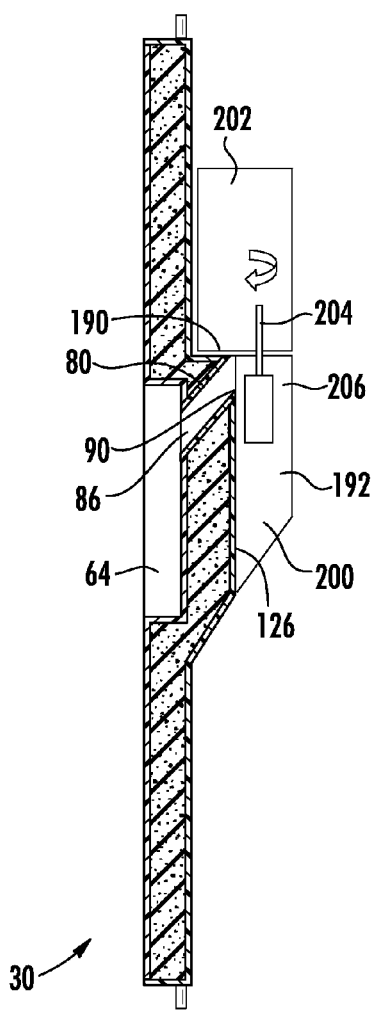
FIG. 12 is a cross-sectional view of one embodiment of the vacuum insulated door structure.

Referring now to the embodiment illustrated in FIG. 12, the vacuum insulated door structure 30 can be configured to include a module receptacle 190 disposed proximate the first wall offset 126 and the first wall conduit opening 90, such that the module receptacle 190 is in communication with the inner conduit surface 86. The module receptacle 190 is also in communication with the cooling loop, wherein the module receptacle 190 is configured to receive at least one cooling module 192 that can be coupled with the cooling loop of the refrigerator 10.

In various embodiments, more than one module receptacle 190 can be defined by the vacuum insulated door structure 30 such that more than one cooling module 192 can be disposed on the vacuum insulated door structure 30 and connected to one or more cooling loops of the refrigerator 10. The location of the module receptacles 190 on the vacuum insulated door structure 30 can define the location of various specialty cooling modules 192 that can be placed upon and typically removably mounted to one or more module receptacles 190 (by hand and without the use of tools) of the refrigerator 10. By way of explanation, and not limitation, examples of cooling modules 192 can include at least one of a turbo chill module;
a fast freeze module;
a shock freeze module;
a temperature controlled crisper compartment module;
a fresh food compartment module;
an ice making module;
a heat exchanger module for dispensing cold or chilled water;
a heat exchanger module for creating cold or chilled water to facilitate its carbonation and dispense a carbonated beverage; and
an airless cooling module.

In addition, the cooling modules 192 having at least one product dispensing function can be placed in the module receptacle 190 proximate the first wall offset 126, such that the cooling module 192 is in fluid communication with the inner conduit surface 86, the second outer facing surface 54, and the second wall offset 64. In this manner, cooled products from the cooling modules 192 having at least one product dispensing function can be disposed from the cooling module 192 through the tubular member 80 and into the second wall offset 64, such that a user of the refrigerator 10 can collect the cooled product as desired. In addition, more than one cooling module 192 can use the same tubular member 80 as a common conduit for dispensing cooled products into the second wall offset 64. Alternatively, two or more tubular members 80 can be implemented to serve two or more corresponding cooling modules 192 to dispense cooled products into the second wall offset 64.

As illustrated in the embodiment of FIG. 12, an ice making module 200 is disposed in the cooling module receptacle 190 proximate the first wall offset 126. The ice making module 200 includes an ice container 202 for collecting ice that is made within the ice making module 200 and an impeller 204 for directing the ice collected within the ice container 202 into and through the at least one tubular member 80 and to the second wall offset 64. A receptacle insulation material 206 can be disposed within the module receptacle 190 and around the ice making module 200 to insulate the ice making module 200, such that the use of cooling within the cooling module 192 can be substantially maximized. The receptacle insulation material 206 can include, but is not limited to, polyurethane foam, rigid insulation, or other insulation material.

Figure 2:
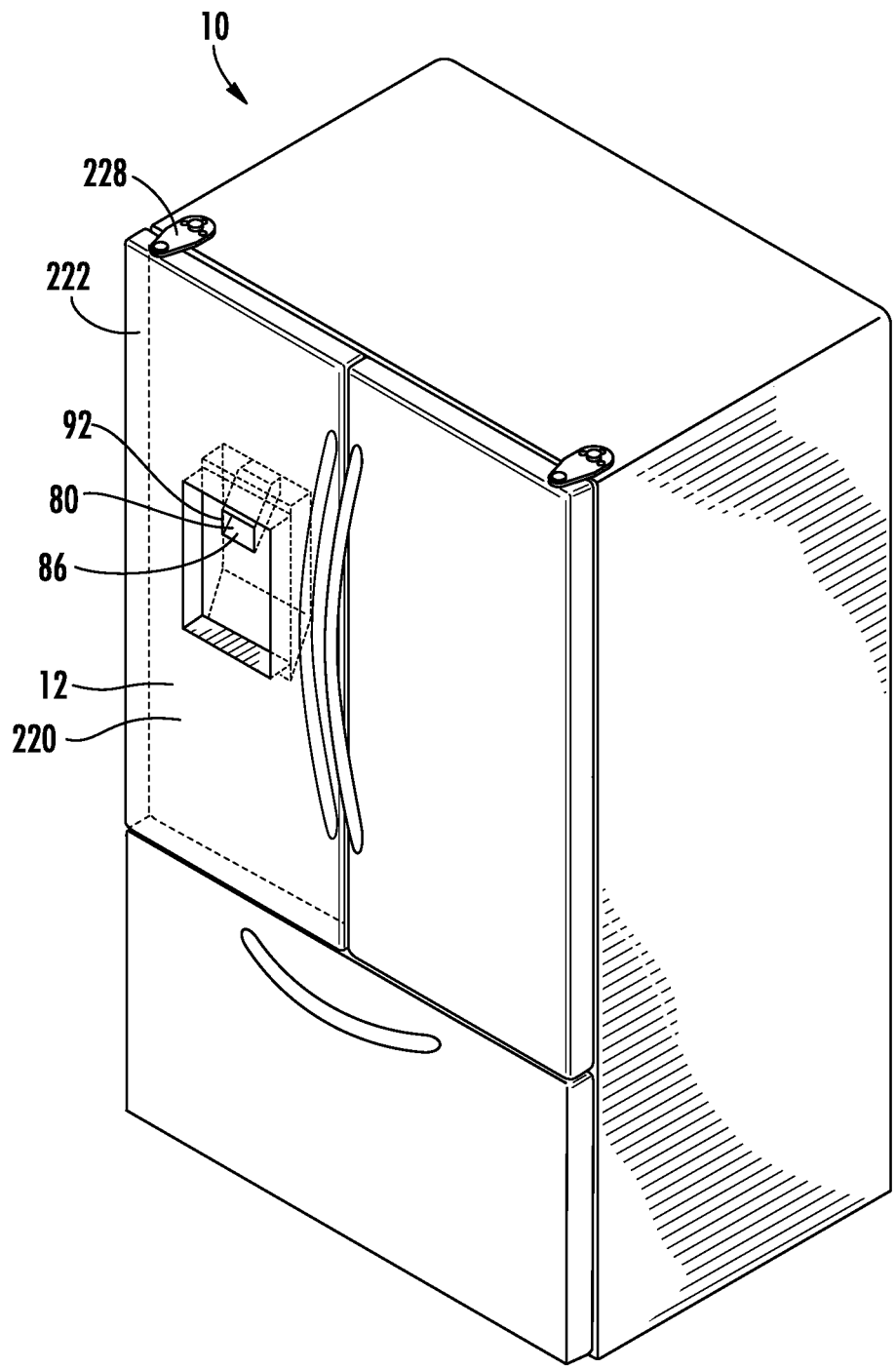
FIG. 2 is a top perspective view of the refrigerator of FIG. 1 with the door in the closed position.
Figure 13:
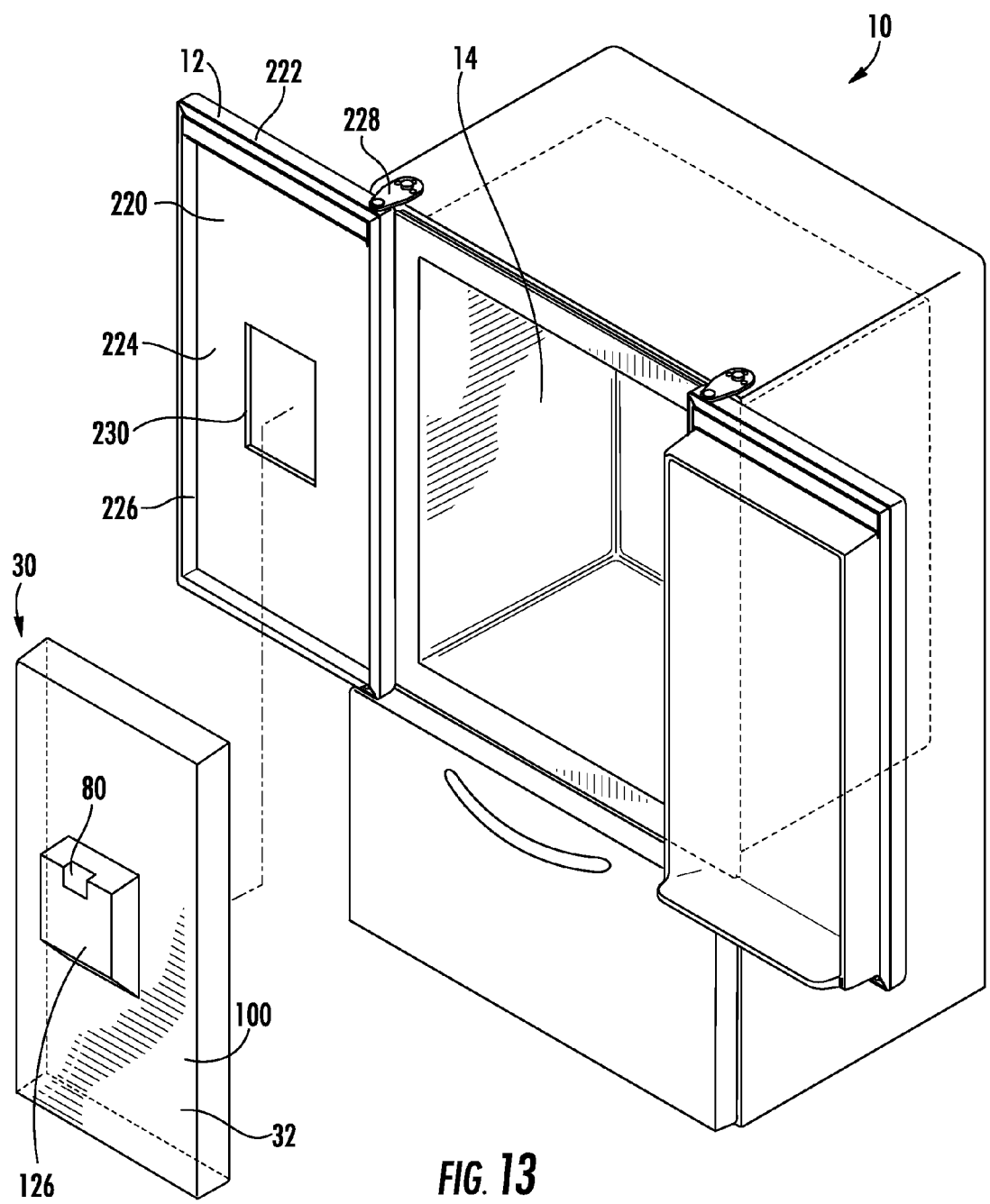
FIG. 13 is a partially exploded top perspective view of the refrigerator of FIG. 1.

Referring now to the embodiments of FIGS. 1, 2 and 13, the door 12 of a refrigerator 10 can include a metal clad covering 220 having a finished outer surface 222 and an interior surface 224. The metal clad covering 220 also includes a door opening 230 defined by the metal clad covering 220 through which the second wall offset 64 can be accessed. The interior surface 224 of the metal clad covering 220 is configured to be disposed on at least a portion of the outside surface 100 of the vacuum insulated door structure 30. The finished outer surface 222 of the metal clad covering 220 can have varying finishes that can include, but are not limited to, painted metal, stainless steel, magnetic stainless steel-type finishes, or other metallic finish. The interior surface 224 of the metal clad covering 220 defines a door structure receptacle 226 for receiving the outside surface 100 of the vacuum insulated door structure 30. In various other alternate embodiments, the outer surface of the vacuum insulated door structure 30 can include a finished outer surface 222 of the door of the refrigerator 10. In such an embodiment, various indicia, patterns, or colors, can be disposed on the outside surface 100 of the vacuum insulated door structure 30.

In other various embodiments, the outside surface 100 of the vacuum insulated door structure 30 can include one or more integrated shelves or one or more integrated shelf receptacles for receiving one or more selectively removable shelves for holding items that can be cooled within the interior 14 of the refrigerator 10. In various other embodiments of the refrigerator 10, the cooling loop of the refrigerator 10 can be routed through a hinged portion 228 of the refrigerator 10. In this manner, the main loop can be configured to run through the hinged portion and into the door 12 to the cooling module receptacle 190 of the vacuum insulated door structure 30. In still other various embodiments, a conduit for running the cooling loop through the vacuum insulated door structure 30 can be provided through the vacuum insulated door structure 30 or in a space provided between the metal clad covering 220 and the vacuum insulated door structure 30, or both.

Figure 14:
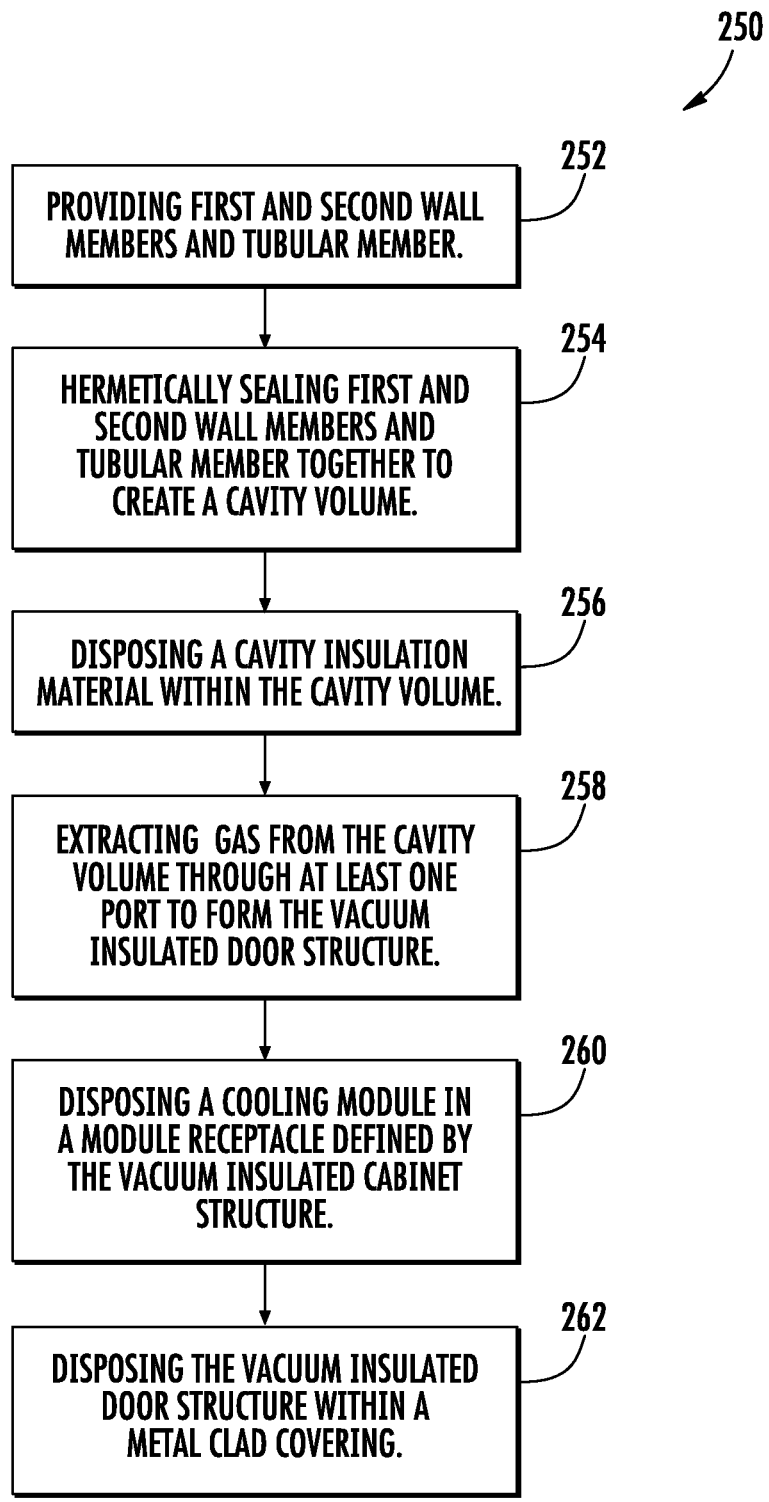
FIG. 14 is a schematic flow diagram showing a method for creating the vacuum insulated door structure of FIG. 1.

Another aspect of the refrigerator 10 as illustrated in FIG. 14 includes a method 250 for creating a vacuum insulated door structure 30 for a refrigerator 10. A first step 252 in this method 250 includes providing first and second wall members 32, 50 and at least one tubular member 80 as described above. This step 252 of the method 250 also includes disposing a barrier layer 106 comprising a hermetic carrier film 106A and a heat simulator onto at least a portion of the first and second wall members 32, 50 and the tubular member 80. The next step 254 in the method 250 includes hermetically sealing the first and second wall members 32, 50 and the at least one tubular member 80 together to create and define the cavity volume 104.

As illustrated in the embodiment of FIG. 14, the method 250 also includes the step 256 of disposing a cavity insulation material 108 within the cavity volume 104 defined by the first wall inner facing surface 40, the second wall inner facing surface 52, and the outer conduit surface 88 of the at least one tubular member 80.

After the cavity insulation material 108 is disposed within the cavity volume 104, and the cavity volume 104 is hermetically sealed, a next step 258 in the method 250 includes extracting gas 166 from the cavity volume 104 through the at least one port 150 disposed on the vacuum insulated door structure 30, wherein the cavity volume 104 is configured to maintain at least partial vacuum within the cavity volume 104.

In the various embodiments, the cavity insulation material 108 can be disposed within the cavity volume 104 either before or after the first wall member 32 is hermetically sealed to the second wall member 50. In addition, and as described above, where the cavity insulation material 108 is disposed within the cavity volume 104 after the cavity volume 104 is hermetically sealed, the method 250 can include the step 256 of injecting the cavity insulation material 108 into the cavity volume 104 through the at least one injection port 168 and into the cavity volume 104. The at least one vacuum port 164 is also used to extract gas 166 from the cavity volume 104 to create the desired vacuum within the cavity volume 104.

As illustrated in FIG. 14, the method 250 can also include the step 260 of providing a cooling module 192 and disposing the cooling module 192 within the module receptacle 190 defined by the first wall member 32 proximate the first wall offset 126 and in communication with the inner conduit surface 86 and the second wall offset 64. As discussed above, when the cooling module 192 is disposed within the module receptacle 190, the cooling loop is in fluid communication with the cooling module 192 wherein the cooling loop includes the evaporator, condenser and cooling fluid. This step 260 of the method 250 can also include disposing the receptacle insulation material 206 within at least a portion of the module receptacle 190 to surround and insulate the cooling module 192. As illustrated in the embodiment of FIG. 12, the cooling module 192 can include an ice maker and dispenser and a water dispenser, wherein the ice and water dispensers are in fluid communication with the inner conduit surface 86 and the second wall offset 64, such that a user of the refrigerator 10 can collect cooled products disposed by the ice and water dispensers.

As illustrated in FIG. 14, the method 250 can also include the step 262 of providing a metal clad covering 220 disposing the vacuum insulated door structure 30 within the door structure receptacle 226 of the metal clad covering 220, such that the interior surface 224 of the metal clad covering 220 is proximate the outside surface 100 of the vacuum insulated door structure 30.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A vacuum insulated door structure comprising:
a first wall member having a first wall perimetrical edge, a first wall barrier layer, an inner facing surface and an outer facing surface;
a second wall member having an inward facing surface, an outward facing surface, a second wall barrier layer, and a second wall perimetrical edge coupled to the first wall member proximate the first wall perimetrical edge, wherein the second wall member comprises at least four interior sidewalls and a back wall that defines a second wall offset;
at least one tubular member extending between the first wall member and the second wall offset, wherein an inner conduit surface of the at least one tubular member provides fluid communication between the outer facing surface and the outward facing surface of the second wall member; and
a cavity insulation material disposed within a cavity volume defined between the first and second wall members, wherein the cavity volume is hermetically sealed, and wherein the cavity volume includes an at least partial vacuum.

2. The vacuum insulated door structure of claim 1, wherein the first wall member comprises at least four offset sidewalls defining a first wall opening distal from the first wall perimetrical edge, and wherein the at least four offset sidewalls extend from the first wall opening to an offset back wall, wherein the at least four offset sidewalls and the offset back wall define a first wall offset.

3. The vacuum insulated door structure of claim 1, further comprising:
a module receptacle defined at least partially by the first wall member and in communication with the inner conduit surface, wherein the module receptacle is configured to receive at least one cooling module configured to dispense a cooled material through the at least one tubular member and into the second wall offset.

4. The vacuum insulated door structure of claim 1, wherein the first wall barrier layer and the second wall barrier layer each include at least one of a hermetic barrier film and a heat sealing layer.

5. The vacuum insulated door structure of claim 1, wherein the cavity insulation material is polyurethane foam disposed within the cavity volume via at least one port disposed on at least one of the first and second wall members.

6. The vacuum insulated door structure of claim 3, further comprising:
at least one cooling module coupled with the module receptacle and configured to be in fluid communication with the inner conduit surface, wherein each at least one cooling module is in fluid communication with a cooling loop having an evaporator and a coolant fluid.

7. The vacuum insulated door structure of claim 3, wherein the at least four interior sidewalls of the second wall offset extend toward the first wall member.

8. The vacuum insulated door structure of claim 6, wherein polyurethane foam is disposed within the module receptacle about the at least one cooling module, and wherein the at least one cooling module includes an ice maker and dispenser and a water dispenser, wherein the ice maker and water dispenser are in fluid communication with the inner conduit surface and the second wall offset.

9. A refrigerator having a vacuum insulated door structure, the refrigerator comprising:
an insulative first wall member having a first perimetrical edge, a first inner facing surface and a first outer facing surface, wherein the first wall member includes an offset sidewall defining a first wall opening distal from at least a portion of the first perimetrical edge, and wherein the offset sidewall extends from the first wall opening to a first back wall, wherein the offset sidewall and the first back wall include a first wall offset;
an insulative second wall member having a second inner facing surface, a second outer facing surface, and a second perimetrical edge coupled to the first wall member, wherein the second wall member comprises an inner sidewall defining a second wall opening distal from at least a portion of the second perimetrical edge, and wherein the inner sidewall extends from the second wall opening to a second back wall, wherein the inner sidewall and the second back wall include a second wall offset disposed proximate the first wall opening;
an insulative conduit extending between the first wall offset and the second wall offset, wherein an inner conduit surface of the conduit provides a fluid communication between the first outer facing surface and the second outer facing surface;
a barrier layer disposed on at least a portion of the first and second wall members and the conduit; and
a cavity insulation material disposed within a cavity volume defined by the first inner facing surface of the first wall member, the second inner facing surface of the second wall member, and an outer conduit surface of the conduit, wherein the cavity volume maintains an at least partial vacuum within the cavity volume.

10. The refrigerator of claim 9, further comprising:
a module receptacle defined at least partially by the first wall offset and in communication with the inner conduit surface, wherein the module receptacle is configured to receive a cooling module configured to dispense a cooled material through the conduit and into the second wall offset.

11. The refrigerator of claim 9, further comprising:
an insulative perimetrical flange having a first lip and a second lip, wherein the first lip is coupled to the first wall member proximate the first perimetrical edge, and wherein the second lip is coupled to the second wall member proximate the second perimetrical edge.

12. The refrigerator of claim 9, wherein the cavity insulation material is polyurethane foam that is injected into the cavity volume via at least one port disposed on at least one of the first and second wall members, and wherein the barrier layer includes at least one of a hermetic barrier film and a heat sealing layer.

13. The refrigerator of claim 10,
wherein the cooling module is coupled with the module receptacle and configured to be in fluid communication with the inner conduit surface, wherein the cooling module is in fluid communication with a cooling loop having an evaporator, a condenser, a compressor, an expansion device, and a coolant fluid, and wherein polyurethane foam is disposed within at least a portion of the module receptacle about the cooling module.

14. The refrigerator of claim 13, wherein the cooling module includes an ice maker and dispenser and a water dispenser, wherein the ice maker and water dispenser are in fluid communication with the inner conduit surface and the second wall offset.

* * * * *